(12) United States Patent
Weinhold

(10) Patent No.: US 9,334,991 B2
(45) Date of Patent: May 10, 2016

(54) DEVICE FOR THE CONNECTION OF TWO PIPE OR HOSE ENDS PROVIDED WITH FLANGES

(76) Inventor: Karl Weinhold, Neuss (DE)

( * ) Notice: Subject to any disclaimer, the term of this patent is extended or adjusted under 35 U.S.C. 154(b) by 757 days.

(21) Appl. No.: 12/301,674

(22) PCT Filed: May 22, 2007

(86) PCT No.: PCT/EP2007/054912
§ 371 (c)(1),
(2), (4) Date: Feb. 13, 2009

(87) PCT Pub. No.: WO2007/135138
PCT Pub. Date: Nov. 29, 2007

(65) Prior Publication Data
US 2009/0194994 A1    Aug. 6, 2009

(30) Foreign Application Priority Data
May 22, 2006   (DE) .......................... 10 2006 023 902

(51) Int. Cl.
*F16L 23/06*    (2006.01)

(52) U.S. Cl.
CPC ....................................... *F16L 23/06* (2013.01)

(58) Field of Classification Search
CPC ........... F16L 23/04; F16L 23/06; F16L 33/12; F16L 37/20
USPC ........................................ 285/38, 87, 88, 409
See application file for complete search history.

(56) References Cited

U.S. PATENT DOCUMENTS

| | | | | |
|---|---|---|---|---|
| 1,564,837 A * | 12/1925 | Edeborg ........................... | 24/271 |
| 1,758,727 A * | 5/1930 | Wildin ........................... | 251/104 |
| 2,482,374 A * | 9/1949 | Ruschmeyer .................... | 24/271 |
| 2,775,806 A * | 1/1957 | Love ............................... | 24/271 |
| 2,994,934 A * | 8/1961 | Kraus .............................. | 24/271 |
| 3,314,444 A * | 4/1967 | White, Jr. ....................... | 137/377 |
| 4,159,102 A * | 6/1979 | Fallon et al. .................. | 251/149.6 |
| 4,573,717 A * | 3/1986 | Peacock ......................... | 285/365 |
| 4,659,120 A | 4/1987 | Weinhold | |
| 5,522,625 A * | 6/1996 | Flick et al. ..................... | 285/409 |
| 5,622,201 A * | 4/1997 | Chang ............................. | 137/219 |
| 5,653,481 A * | 8/1997 | Alderman ...................... | 285/363 |
| 5,685,663 A * | 11/1997 | Sadri .............................. | 403/284 |
| 5,722,697 A * | 3/1998 | Chen .............................. | 285/91 |
| 7,290,805 B2 * | 11/2007 | Wu ................................. | 285/365 |

FOREIGN PATENT DOCUMENTS

| | | | |
|---|---|---|---|
| DE | 1245656 B | 7/1967 | |
| DE | 2102847 | 8/1971 | |
| EP | 0195914 B1 | 10/1986 | |
| FR | 2076914 A | 10/1971 | |
| GB | 790625 A * | 2/1958 | ............. F16L 23/06 |

* cited by examiner

*Primary Examiner* — David E Bochna
(74) *Attorney, Agent, or Firm* — The Webb Law Firm

(57) ABSTRACT

A device for the connection of free pipe or hose ends provided with flanges, with first, second, third, and fourth clip segments connected to one another in jointed manner, with an essentially U-shaped cross-section, a tensioning lever arranged at one free end of the first clip segment, and at least one spring, wherein the clip segments engage from the outside over the flanges of the pipe or hose ends pushed together, and wherein the free ends of the first and fourth clip segments can be locked by means of the tensioning lever and spring(s). In order to exclude spontaneous opening of the closed device under any circumstances, provision is made for the tensioning lever to be capable of engaging in the tensioned position in positive fit with the free end of the adjacent fourth clip segment with the tensioning lever capable of being connected.

20 Claims, 4 Drawing Sheets

DEVICE FOR THE CONNECTION OF TWO PIPE OR HOSE ENDS PROVIDED WITH FLANGES

BACKGROUND OF THE INVENTION

1. Field of the Invention

The invention relates to a device for the connection of free pipe or hose ends provided with flanges. More particularly, the invention includes a plurality of clip segments connected to one another in a jointed manner, an essentially U-shaped cross-section, a tensioning lever arranged at one free end of a clip segment and a spring, wherein the clip segments engage over the flanges of the pipe or hose ends pushed together, and wherein the free ends of the first and last clip segment can be locked by means of tensioning lever and spring.

2. Description of Related Art

Such devices, designated in brief as pipe or hose couplings or also as pipe or hose clips, have long been known in the most widely differing embodiments and designs. In the simplest case they consist of a clip having two clip segments, wherein both the clip segments are connected to one another at one end in each case in a jointed manner by means of a bolt (EP 0 195 914 A2). To close, the opened clip is then laid over the flange of the pipe ends pushed together, or, correspondingly, over ring assemblies of hose spouts, wherein the side parts of the clip segments engage around the flanges/ring assembly from the outside and reliably prevent the pipe or hose ends from being pushed apart axially (opening).

In order to avoid the closure of time-consuming screw connections, the known pipe or hose couplings are designed as what are known as quick-action couplings. To achieve this, a tensioning lever is provided, which is secured by means of a jointed bolt in the free end area of a clip segment, while a next jointed bolt serves to secure the one end of at least one spring. By its other end the minimum of one spring is hooked into a cut-out of the other clip segment. The jointed bolts are secured in each case with the aid of nuts.

Although the known pipe or hose couplings have been in use for a long time and with great success, there are areas of use in which the function of the pipe or hose coupling can be set at risk. If for some reason the spring becomes longer, this may lead to the clip opening of its own accord, wherein, under certain circumstances the uncontrolled destruction of the clip may come about. This can occur, for example, if a known pipe coupling is used in the vicinity of hot areas, or if hot slag material in the vicinity of furnaces falls over this pipe coupling and leads to the loss of the tensioning force of the spring/s.

SUMMARY OF THE INVENTION

The invention is therefore based on the object of forming and further developing the device referred to in the preamble and described in greater detail heretofore, for the connection of two pipe or hose ends, in such a way that spontaneous opening of the closed device is excluded under any circumstances. It is further desirable that a simple and economical structure and the easy handling of the device should be retained.

The object is resolved according to the device of the present invention, in that the tensioning lever can be connected in positive fit to the free end of the adjacent clip segment, and in that the tensioning lever can be engaged in the tensioned position.

The invention recognises that, by means of an additional positive connection of the free ends of the clip segments, permanent securing can be achieved even if the minimum of one spring is unable for some reason to fulfil its task any longer. At the same time the situation is prevented in which the tensioning lever in the closed state might likewise open spontaneously.

According to a further teaching of the invention, the clip segments and the tensioning lever are made of sheet steel sections, and the tensioning lever is designed in hook form in the area of its jointed connection with the clip segment, such that it can be hooked to corresponding projections of the free end of the adjacent clip segment. Due to the hook-shaped design of the tensioning lever and the positive-fit connection with the projections of the other clip segment, any radial forces which may arise are absorbed in the event of the spring(s) losing tension.

According to a further preferred embodiment of the invention, the projections corresponding to the hooks of the tensioning lever are formed from the ends of a bolt, which is mounted in two holes in the side parts of the free end of the other clip segment. Particularly preferably, the bolt is secured against axial movement. For this purpose, in a further embodiment this has at least one groove and is connected in the area of the groove in positive fit to the clip segment. This can be effected, for example, by means of a web projecting from the clip segment.

One embodiment of the invention, particularly elegant from the technical manufacturing point of view, makes provision for a tube to be arranged between the holes in the side parts of the clip segment, which is as long as the clear distance between the holes and which is pressed to the bolt by means of crimping in the area of the bolt groove. In this way, no further change needs to be undertaken with regard to the clip segment.

A further teaching of the invention makes provision for the tensioning lever to have at its free end a movable engagement element which in the tensioned state of the tensioning lever can be connected in positive fit to the clip segment. In this situation, in order to secure the movable element, preferably a pin can be bent out of the clip segment, which has a rear cut-out or a hole for accommodating the engagement element.

In order in this case too to avoid as far as possible a screw connection, the engagement element should be simple to operate. To achieve this, a further embodiment of the invention makes provision for the engagement element to be designed as a spring-loaded closure mechanism. By means of a correspondingly oblique shape of the one end of the engagement element, when the tensioning lever is laid over into the tensioned state an "automatic" locking action takes place of the engagement element with the clip segment located beneath it.

In order now to be able to open the device according to the invention again, according to a further embodiment of the invention the engagement element has an operating handle, which preferably is formed as a ring arranged in jointed manner at the engagement element. By pulling the ring against the spring force, the locked end of the engagement element is unlocked and opening of the tensioning lever therefore made possible.

The invention is explained in greater detail hereinafter on the basis of a drawing representing an embodiment of a pipe coupling clip, to be regarded solely as a preferred embodiment.

DETAILED DESCRIPTION OF THE INVENTION

Figure 1:
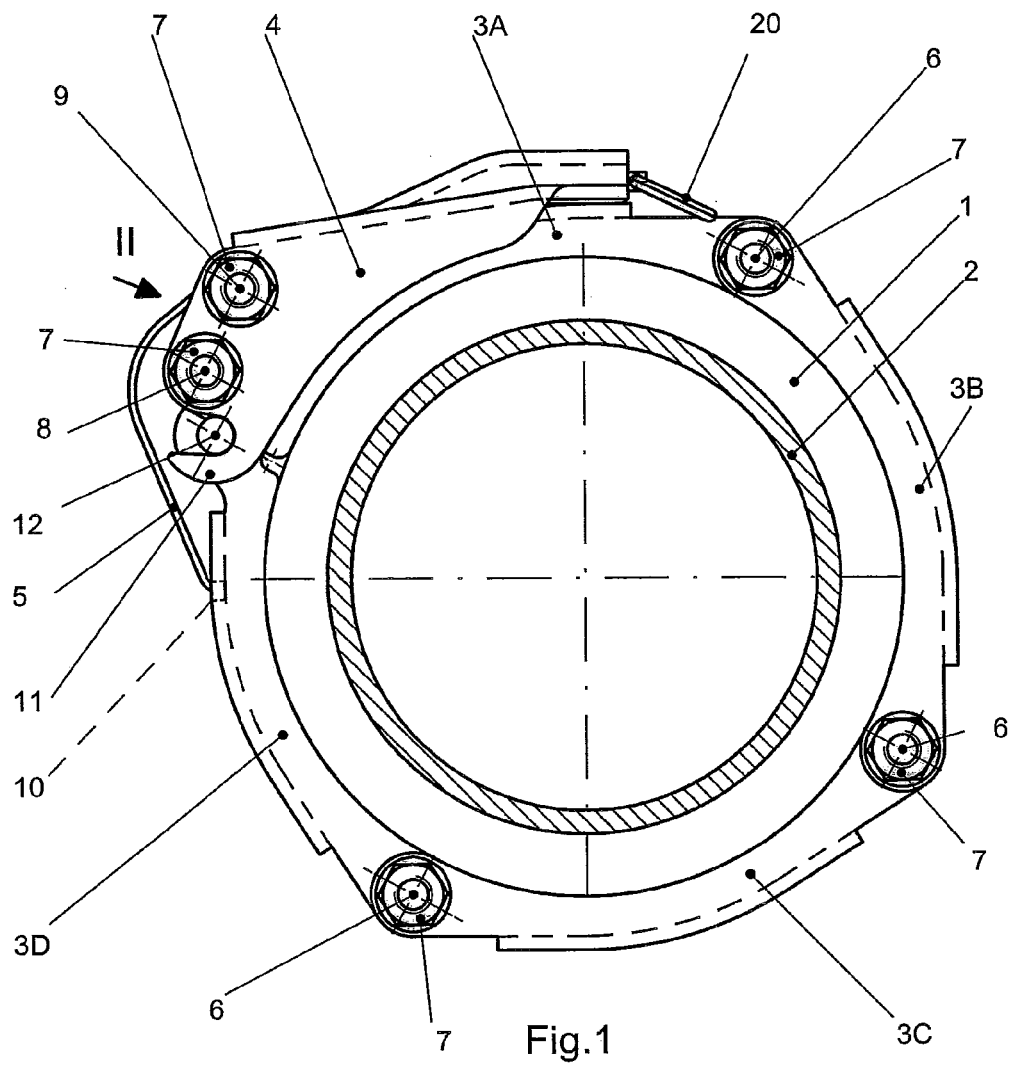
FIG. 1 shows the device according to the invention in a closed state, in a side view.

The coupling represented by way of example is a pipe coupling for the connecting of two pipe ends 2 provided with flanges 1. In the present embodiment example, the device according to the invention consists of four clip segments 3A, 3B, 3C, 3D, a first clip segment 3A, second clip segment 3B, third clip segment 3C, and fourth clip segment 3D. The clip segments 3A, 3B, 3C, 3D are connected to one another in jointed fashion, and a closure lock element which is formed from a tensioning lever 4 and a spring 5.

The clip segments 3A, 3B, 3C, 3D are connected to one another in jointed fashion by means of jointed bolts 6, wherein the jointed bolts 6 are secured at their ends with the aid of nuts 7. The tensioning lever 4 is secured by means of a further jointed bolt 8 at the free end of the first clip segment 3A, while a further jointed bolt 9 serves to secure one end of the spring 5. The spring 5 is hooked by its other end in a cut-out 10 at the (opposite) free end of the fourth clip segment 3D. The jointed bolts 8 and 9 are likewise in each case secured with the aid of nuts 7.

It is understood that the coupling clip according to the invention can also consist of another number of clip segments. In the simplest case, as with the prior art, only two clip segments are provided, but, depending on the diameter of the pipe, there is the possibility of the number of the individual clip segments being increased.

The clip segments 3A, 3B, 3C, 3D each have at both their ends a side part, projecting inwards and not designated in any greater detail, such that the clip segments 3A, 3B, 3C, 3D have a U-shaped cross-section. The side parts of the clip segments 3A, 3B, 3C, 3D in this situation engage over the flanges 1 of the pipe ends 2 from the outside.

While with the prior art the connection of the free ends of the clip segments is undertaken only by the spring, according to the invention provision is made for the tensioning lever 4 to be capable of being connected by positive fit to the free end of the adjacent fourth clip segment 3D, and to be capable of being engaged in its tensioned position. To do this, the tensioning lever 4 is designed as a hook shape in the area of its jointed connection to the first clip segment 3A. In the embodiment shown, which to this extent is preferred, it has two hooks 11, which can be hooked to corresponding projections of the free end of the adjacent fourth clip segment 3D.

In the embodiment example, the projections are formed from the ends of a bolt 12, which is mounted in two holes, not designated in any greater detail, in the side parts of the free end of the fourth clip segment 3D.

Figure 2:
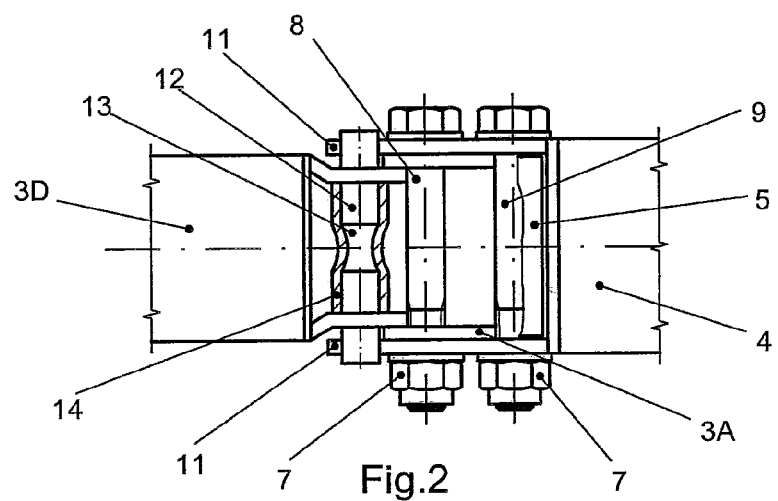
FIG. 2 shows a part of the device in a view from above, in the direction of the arrow II from FIG. 1, wherein for better understanding the spring is represented as broken upwards.

In the view from above according to FIG. 2, in which, for better overview, the spring 5, which otherwise covers the jointed bolts 8 and 9 as well as the bolt 12, is represented as broken upwards, the bolt 12 can be more readily identified. It can be seen that the bolt 12 has a central groove 13. This groove 13 serves to provide the axial securing of the bolt 12 in the holes of the fourth clip segment 3D. To achieve this, a tube 14 is arranged between the holes of the fourth clip segment 3D, which is as long as the clear distance between the holes and which is pressed onto the bolt 13 by crimping in the area of the groove 13 of the bolt 12, such that this is fixed in its position.

Figure 3:
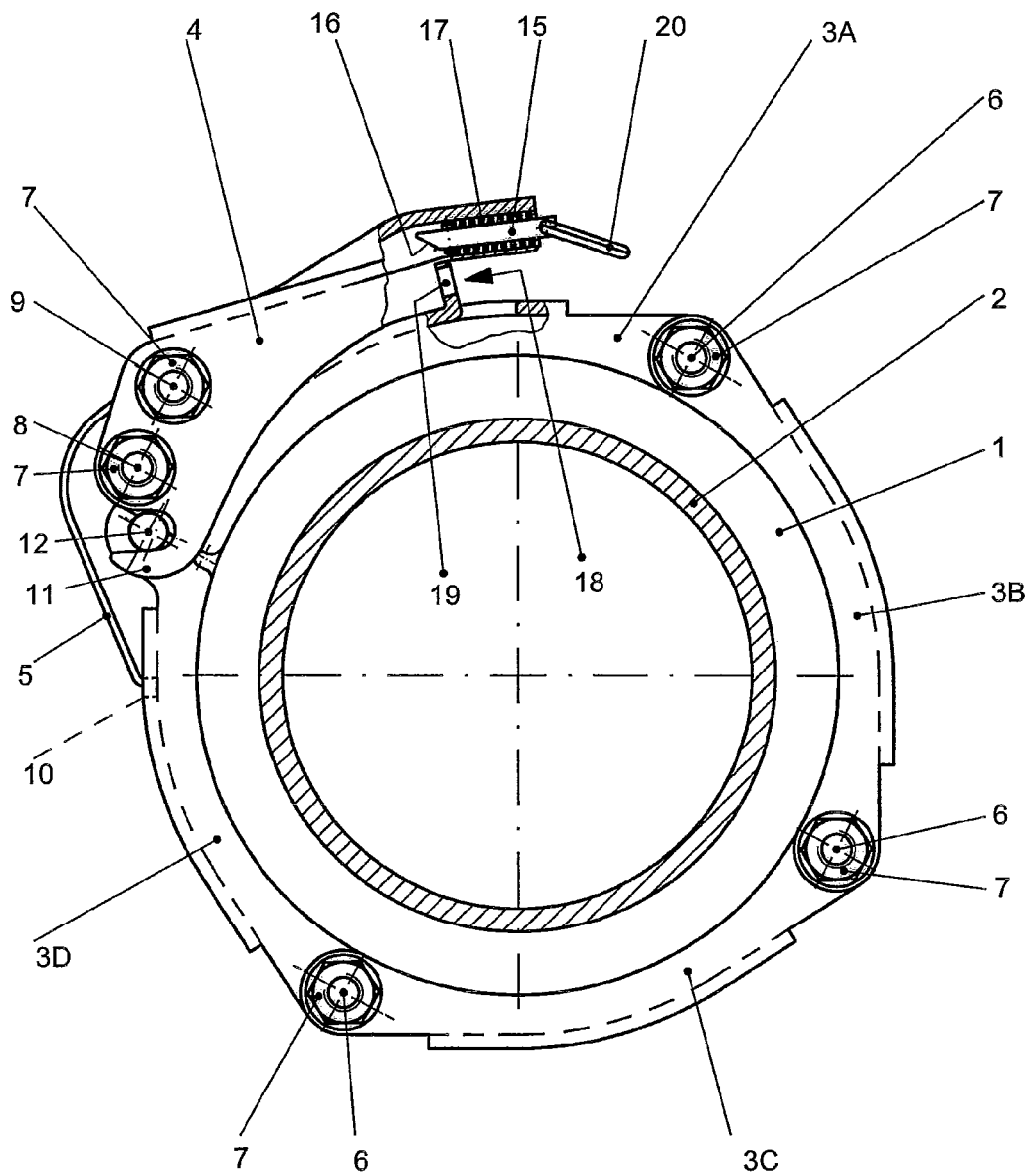
FIG. 3 shows the device according to the invention in the unlocked position.

As already explained heretofore, the invention is also characterised by the fact that the tensioning lever 4 can be engaged in its tensioned position. To achieve this, the tensioning lever 4 has at its free end a movable engagement element 15, which in the tensioned state of the tensioning lever 4 is connected by positive fit to the first clip segment 3A. Its function can be identified particularly clearly from FIG. 3. There it can be seen that the engagement element 15 has an oblique surface 16 and is mounted in a spring 17. From the first clip segment 3A a pin 18 is bent out, which has a hole 19 for accommodating the engagement element 15. When the tensioning lever 4 is closed, the special geometric design causes an "automatic" engagement effect, in that the spring-loaded engagement element 15 interacts like a door latch with the hole 19 of the first clip segment 3A. For easier unlocking, the engagement element 15 has an operating handle, which in the embodiment represented, and to this extent preferred, consists of a ring 20 arranged in jointed fashion at the engagement element 15. In the unlocked position represented in FIG. 3, the tensioning lever 4 is still held flat above the first clip segment 3A by the spring effect.

Even if it has been described heretofore that in the embodiment represented, and to this extent preferred, the movable engagement element is secured to the tensioning lever, it is likewise conceivable in the context of the invention that the engagement element can be secured at the first clip segment 3A and the unlatching to engage the engagement element is carried out in the tensioning lever 4.

Figure 4:
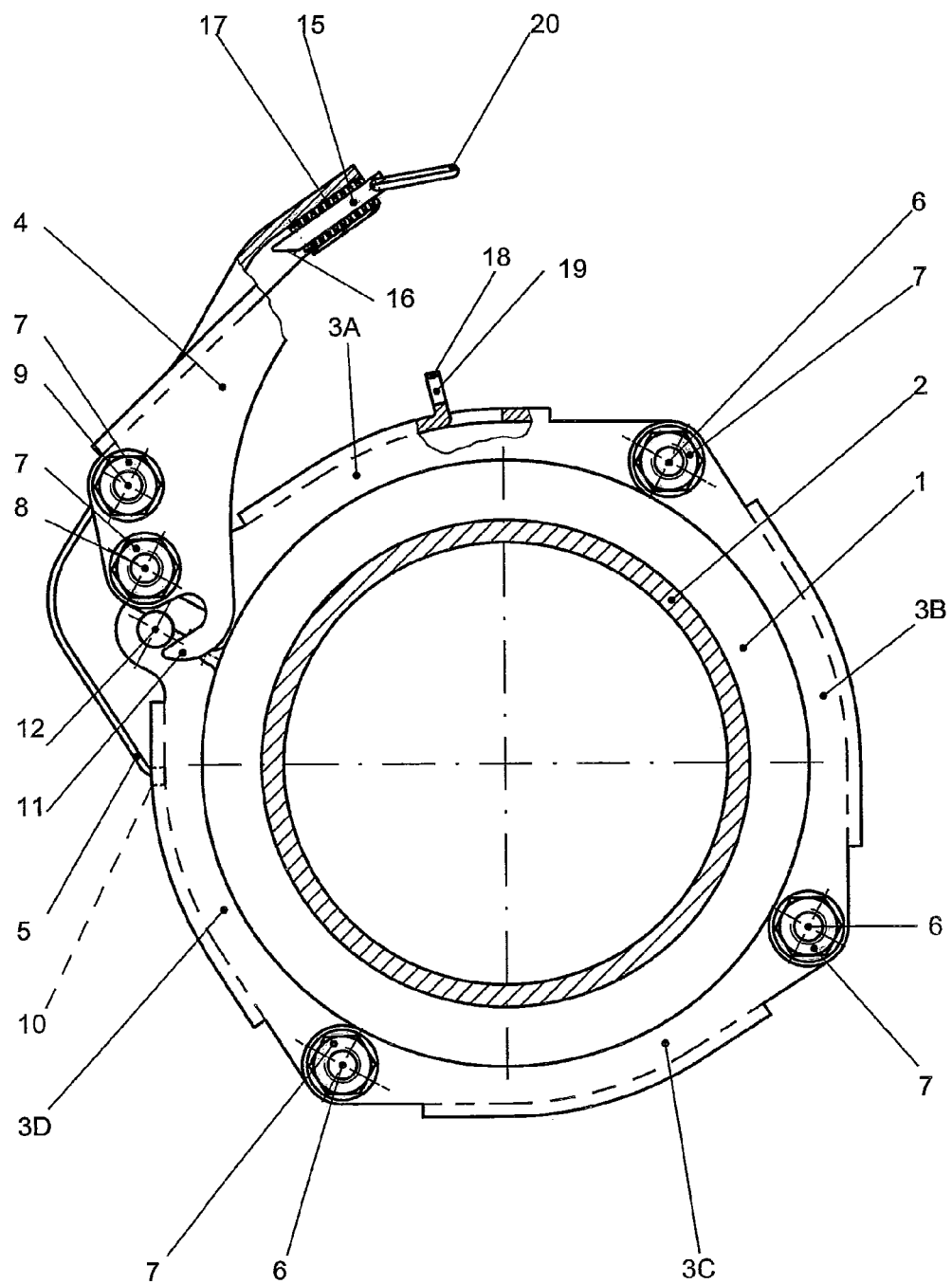
FIG. 4 shows the device according to the invention in a partially opened position.

FIG. 4 now shows the device according to the invention during the opening procedure. To achieve this, the unlocked tensioning lever 4 is raised, such that the hooks 11 can be released from the bolt 12, and the coupling clip can be drawn over the flanges 1 of the pipe ends 2. If the spring 5 is broken or destroyed, although the free ends of the first and fourth clip segments 3A and 3D fall apart no further parts can come free.

Figure 5:
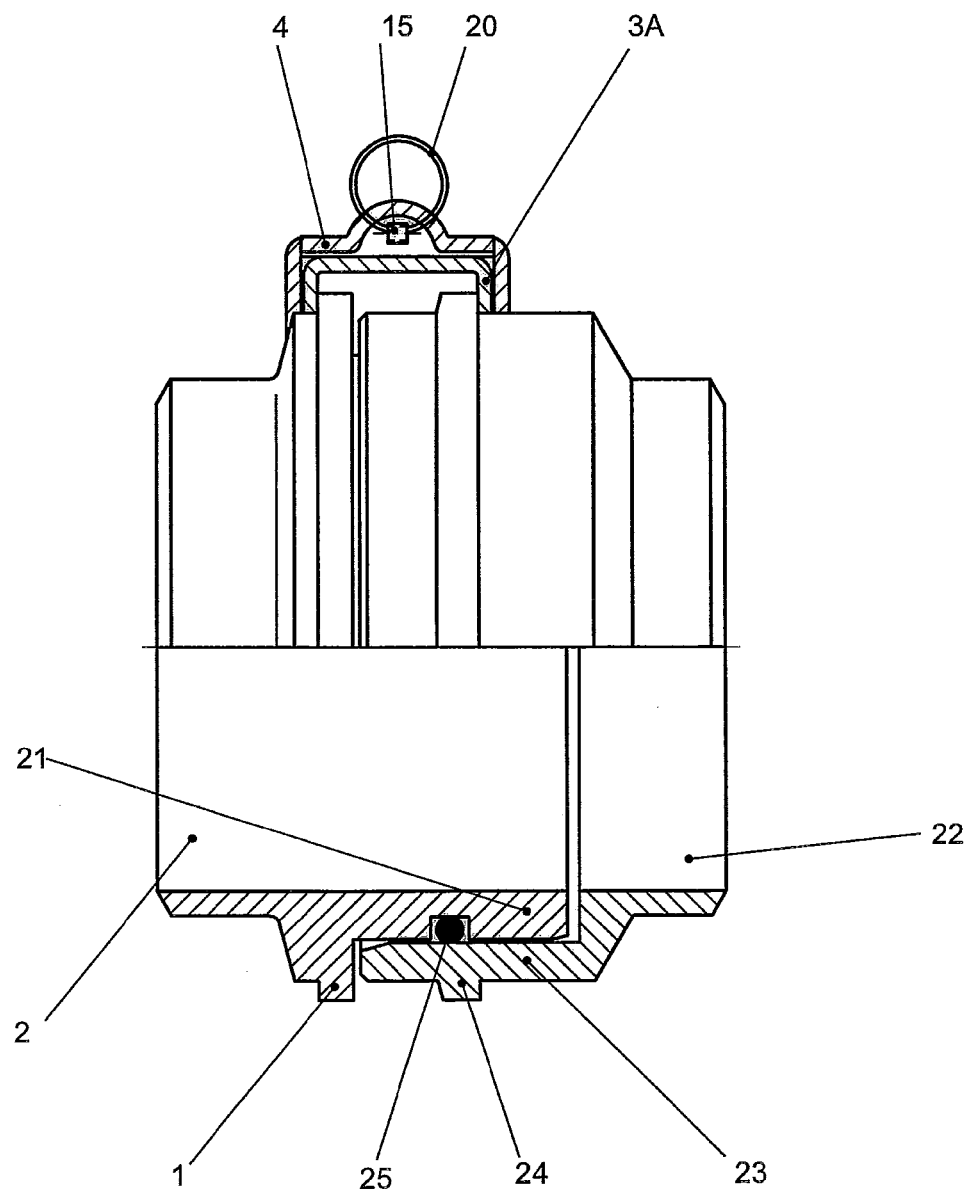
FIG. 5 shows the device according to the invention in a side view/sectional representation perpendicular to the longitudinal axis.

Finally, in. FIG. 5 the device according to the invention is represented in a side view or sectional representation perpendicular to the longitudinal axis of the pipes. Here it can be seen that the device according to the invention is also well-suited for such pipes which can be plugged together without loss of cross-section. For this purpose, the pipe end 2 already referred to has a plug part 21 and another pipe end 22 has a sleeve 23, these being capable of being pushed into one another. As the pipe end 2 has a flange 1, so too the pipe end 22 and its sleeve 23 respectively have a flange 24. The flanges 1 and 24 respectively, as can be seen in the upper part of FIG. 5, are surrounded laterally by the U-shaped cross-section of the clip segments, of which only the first clip segment 3A is represented, in order to close the coupling. In this situation, a seal 25 arranged in a cut-out in the plug part 21, not described in greater detail, provides a reliably tight connection, wherein the seal 25 is essentially protected against dust and environmental influences.

Even if in the embodiment example only one pipe coupling clip is represented, the device according to the invention is also well-suited for connecting hose ends, if suitable spouts with flanges are inserted into them. In this situation, the side parts of the clip segments can press the hose ends radially onto the spouts, such that a reliable connection is guaranteed.

The invention claimed is:

1. A device for the connection of free pipe or hose ends provided with flanges comprising:
   a plurality of clip segments comprising a first clip segment and a last clip segment, the clip segments being connected to one another in a jointed manner, with an essentially U-shaped cross-section,
   a tensioning lever having a first end and a second end, the tensioning lever connected, at a first connection point, at one free end of the first clip segment between the first end and the second end, the tensioning lever being rotatable at the first connection point relative to the first clip segment about a pivot point on the first clip segment, and
   at least one spring,
   wherein the clip segments are operative for engaging the pipe or hose from the outside over the flanges of the pipe or hose ends pushed together,
   wherein the free end of the first clip segment and a free end of the last clip segment are releasably connected by means of the tensioning lever,
   wherein the tensioning lever is releasably connected, at a second connection point, at the first end in positive fit to the free end of the adjacent last clip segment,
   wherein the second end of the tensioning lever is releasably connected, at a third connection point, with the first clip segment in the tensioned position, and
   wherein the tensioning lever has at the second end a movable spring-loaded engagement element, which, (A) in a tensioned state of the tensioning lever, is inserted through an opening on the first clip segment to lock the tensioning lever in the tensioned state, and which, (B) in the unlocked state of the tensioning lever, is removed from the opening on the first clip segment.

2. The device of claim 1, wherein the clip segments and the tensioning lever are made of sheet steel sections, and in that the tensioning lever is designed in hook form in the area of its jointed connection with the first clip segment and can be hooked to corresponding projections of the free end of the adjacent last clip segment.

3. The device of claim 2, wherein the projections are formed from the ends of a bolt, which is mounted in two holes in side parts of the free end of the last clip segment.

4. The device of claim 3, wherein the bolt is secured against axial movement.

5. The device of claim 4, wherein the bolt has at least one groove and is connected in the area of the groove in positive fit to the last clip segment.

6. The device of claim 4, wherein, in the tensioned state of the tensioning lever, the movable spring-loaded engagement element is connected in positive fit to the first clip segment by engaging a pin provided on the first clip segment.

7. The device of claim 3, wherein the bolt has at least one groove and is connected in the area of the groove in positive fit to the last clip segment.

8. The device of claim 7, wherein a tube is arranged between the holes of the last clip segment, which is as long as a distance between the holes in the side parts and which is pressed to the bolt by means of crimping in the area of the groove of the bolt.

9. The device of claim 7, wherein, in the tensioned state of the tensioning lever, the movable spring-loaded engagement element is connected in positive fit to the first clip segment by engaging a pin provided on the first clip segment.

10. The device of claim 3, wherein a tube is arranged between the holes of the last clip segment, which is as long as a distance between the holes in the side parts and which is pressed to the bolt by means of crimping in the area of a groove of the bolt.

11. The device of claim 10, wherein, in the tensioned state of the tensioning lever, the movable spring-loaded engagement element is connected in positive fit to the first clip segment by engaging a pin provided on the first clip segment.

12. The device of claim 3, wherein, in the tensioned state of the tensioning lever, the movable spring-loaded engagement element is connected in positive fit to the first clip segment by engaging a pin provided on the first clip segment.

13. The device of claim 2, wherein, in the tensioned state of the tensioning lever, the movable spring-loaded engagement element is connected in positive fit to the first clip segment by engaging a pin provided on the first clip segment.

14. The device of claim 1, wherein a pin is bent out of the first clip segment, which has the opening for accommodating the movable spring-loaded engagement element.

15. The device of claim 14, wherein the movable spring-loaded engagement element is designed as a spring-loaded closure mechanism.

16. The device of claim 1, wherein the movable spring-loaded engagement element is designed as a spring-loaded closure mechanism.

17. The device of claim 16, wherein the movable spring-loaded engagement element has an operating handle.

18. The device of claim 17, wherein the operating handle consists of a ring arranged in jointed manner at the movable spring-loaded engagement element.

19. A device for the connection of flanged pipes or hoses, the device comprising:
   flanged pipes or hoses;
   a plurality of clip segments comprising a first clip segment, a second clip segment, a third clip segment, and a fourth clip segment, the clip segments being connected to one another in a jointed manner, with an essentially U-shaped cross-section,
   a tensioning lever having a first end and a second end, the tensioning lever connected, at a first connection point, at one free end of the first clip segment between the first end and the second end, the tensioning lever being rotatable at the first connection point relative to the first clip segment about a pivot point on the first clip segment, and
   at least one spring,
   wherein the clip segments engage the pipes or hoses from the outside over the flanges of pipe or hose ends pushed together,
   wherein the free end of the first clip segment and a free end of the fourth clip segment are locked by means of the tensioning lever and the at least one spring,
   wherein the tensioning lever is releasably connected, at a second connection point, at the first end to the free end of the adjacent fourth clip segment,
   wherein the second end of the tensioning lever is releasably connected, at a third connection point, with the first clip segment in the tensioned position, and
   wherein the tensioning lever has at the second end a movable spring-loaded engagement element, which, (A) in the tensioned state of the tensioning lever, is inserted through an opening on the first clip segment to lock the tensioning lever in the tensioned state, and which, (B) in the unlocked state of the tensioning lever, is removed from the opening on the first clip segment.

20. A device for the connection of free pipe or hose ends, the device comprising:
- a plurality of clip segments having at least a first clip segment and a second clip segment, the plurality of clip segments coupled to one another in a jointed manner; and
- a tensioning lever configured for releasably coupling a free end of the first clip segment with a free end of the second clip segment,
- wherein the tensioning lever is rotatably coupled, at a first connection point, to the first clip segment between a first end and a second end of the tensioning lever, the tensioning lever being rotatable at the first connection point relative to the first clip segment about a pivot point on the first clip segment,
- wherein the tensioning lever is releasably coupled, at a second connection point, at the first end to the free end of the second clip segment, and
- wherein the tensioning lever is releasably coupled, at a third connection point, at the second end to the first clip segment by way of a movable spring-loaded engagement element, which, (A) in the tensioned state of the tensioning lever, is inserted through an opening on the first clip segment to lock the tensioning lever in the tensioned state, and which, (B) in the unlocked state of the tensioning lever, is removed from the opening on the first clip segment.

* * * * *